United States Patent
Gong et al.

(10) Patent No.: US 8,521,782 B2
(45) Date of Patent: Aug. 27, 2013

(54) METHODS AND SYSTEMS FOR PROCESSING LARGE GRAPHS USING DENSITY-BASED PROCESSES USING MAP-REDUCE

(75) Inventors: Nan Gong, Solna (SE); Jari Koister, Menlo Park, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 13/524,280

(22) Filed: Jun. 15, 2012

(65) Prior Publication Data

US 2013/0024479 A1    Jan. 24, 2013

Related U.S. Application Data

(60) Provisional application No. 61/509,847, filed on Jul. 20, 2011.

(51) Int. Cl.
*G06F 7/00*     (2006.01)
*G06F 17/30*    (2006.01)

(52) U.S. Cl.
USPC ............................. 707/791; 707/798

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |

(Continued)

OTHER PUBLICATIONS

Kwon et al. "Scalable clustering algorithm for N-body simulations in a shared-nothing cluster", 2010.*

*Primary Examiner* — Hung T Vy
*Assistant Examiner* — Tuan A Pham
(74) *Attorney, Agent, or Firm* — Dergosits & Noah LLP; Todd A. Noah

(57) ABSTRACT

Embodiments are directed to a density-based clustering algorithm that decomposes and reformulates the DBSCAN algorithm to facilitate its performance on the Map-Reduce model. The DBSCAN algorithm is reformulated into connectivity problem using a density filter method and a partial connectivity detector. The density-based clustering algorithm uses message passing and edge adding to increase the speed of result merging, it also uses message mining techniques to further decrease the number of iterations to process the input graph. The algorithm is scalable, and can be accelerated by using more machines in a distributed computer network implementing the Map-Reduce program.

18 Claims, 14 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 7,933,915 B2 * | 4/2011 | Singh et al. ............ 707/760 |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 8,396,884 B2 * | 3/2013 | Singh et al. ............ 707/760 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0274062 A1 * | 12/2006 | Zhang et al. ............ 345/420 |
| 2009/0063415 A1 | 3/2009 | Chatfield et al. |
| 2012/0317142 A1 * | 12/2012 | Broecheler et al. ....... 707/770 |

\* cited by examiner

Original Graph  1000

Density-Based Filter  1002 ← Density Constraints: K >= 3, Distance ε >= 0.5

Filtered Graph  1004

METHODS AND SYSTEMS FOR PROCESSING LARGE GRAPHS USING DENSITY-BASED PROCESSES USING MAP-REDUCE

CLAIM OF PRIORITY

This application claims the benefit of U.S. Provisional Patent Application 61/509,847 entitled A DENSITY-BASED ALGORITHM FOR DISCOVERING CLUSTERS IN LARGE GRAPHS WITH NOISE USING MAP-REDUCE, by Nan Gong and Jari Koister, filed Jul. 20, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to machine learning, and more specifically to a method for performing cluster functions on large graphs to categorize the vertices of the graphs into subsets.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

As social networks have gained in popularity, maintaining and processing the social network graph information using graph algorithms have become an essential source for discovering potential features of the graph. In general, a graph is a mathematical structure comprising an ordered pair $G=(V, E)$, where V is the set of vertices or nodes represent objects, and the elements in set E are edges or lines which represent relationships among different objects. Many real world problems can be abstracted into graph problems, such as, social networks and traffic networks. The great increase in the size and scope of social networks and other similar applications has made it virtually impossible to process huge graphs on a single machine in a "real-time" level of execution.

Distributed computing techniques have been applied to graph computations in order to more efficiently process graph data. One example is Map-Reduce, which is a distributed computing model introduced by Google® that processes large data sets on clusters of computers in parallel using the principles of map and reduce functions commonly used in functional programming. Although many real world problems can be modeled using Map-Reduce, there are still many that cannot be presented very well using this framework. Furthermore, the Map-Reduce model has certain weaknesses that limit its effectiveness with regard to certain important applications, such as cloud computing and social network environments. For example, Map Reduce cannot share information among different slave machines when running map or reduce functions, and not all graph-based algorithms can be mapped onto Map-Reduce; and for certain graph related problems that can be solved by Map-Reduce, the solutions may not be optimum for certain applications (e.g., cloud computing). Increased scalability is another key concern in the development and application of graph processing systems.

What is needed is an effective and efficient way to decompose and reformulate the density-based clustering problem, and make it possible to be solved on Map-Reduce platforms efficiently. Concurrent with this objective is the need to provide a scalable algorithm that will perform faster when there are more machines in a Map-Reduce machine cluster; perform faster merging operations, since with results being calculated on multiple machines, the speed of merging these results is critical; maintain low network traffic by ensuring that the number of messages generated is not high; maintain good load balance by ensuring that all machines in a cluster have similar workloads, and maintain result accuracy.

BRIEF SUMMARY

In an embodiment and by way of example, there are provided mechanisms and methods for decomposing and reformulating the density-based clustering problem, and making it possible to be solved on Map-Reduce platforms efficiently. Embodiments are directed to a density-based clustering algorithm that decomposes and reformulates the DBSCAN algorithm to facilitate its performance on the Map-Reduce model. Present methods of implementing DBSCAN are processing nodes in a graph on a one-by-one basis based on branches of the graph. The DBSCAN algorithm is reformulated into connectivity problem using a density filter method. The density-based clustering algorithm uses message passing and edge adding to increase the speed of result merging, it also uses message mining techniques to further decrease the number of iterations. The algorithm is scalable, and can be accelerated by using more machines in a distributed computer network implementing the Map-Reduce program. An active or halt state in the cluster and edge cutting operations reduces a large amount of network traffic. Good load balance between different machines of the network can be achieved by a splitting function, and results are generally accurate compared to results through straight application of the DBSCAN algorithm.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures

DETAILED DESCRIPTION

Systems and methods are described for implementing the Map-Reduce framework through a density-based algorithm to solve large-scale graph problems. Aspects of the one or more embodiments described herein may be implemented on one or more computers executing software instructions. The computers may be networked in a client-server arrangement or similar distributed computer network, and one or more of the networked computers may execute application programs that require periodic testing to ensure continuing functionality.

Figure 1:
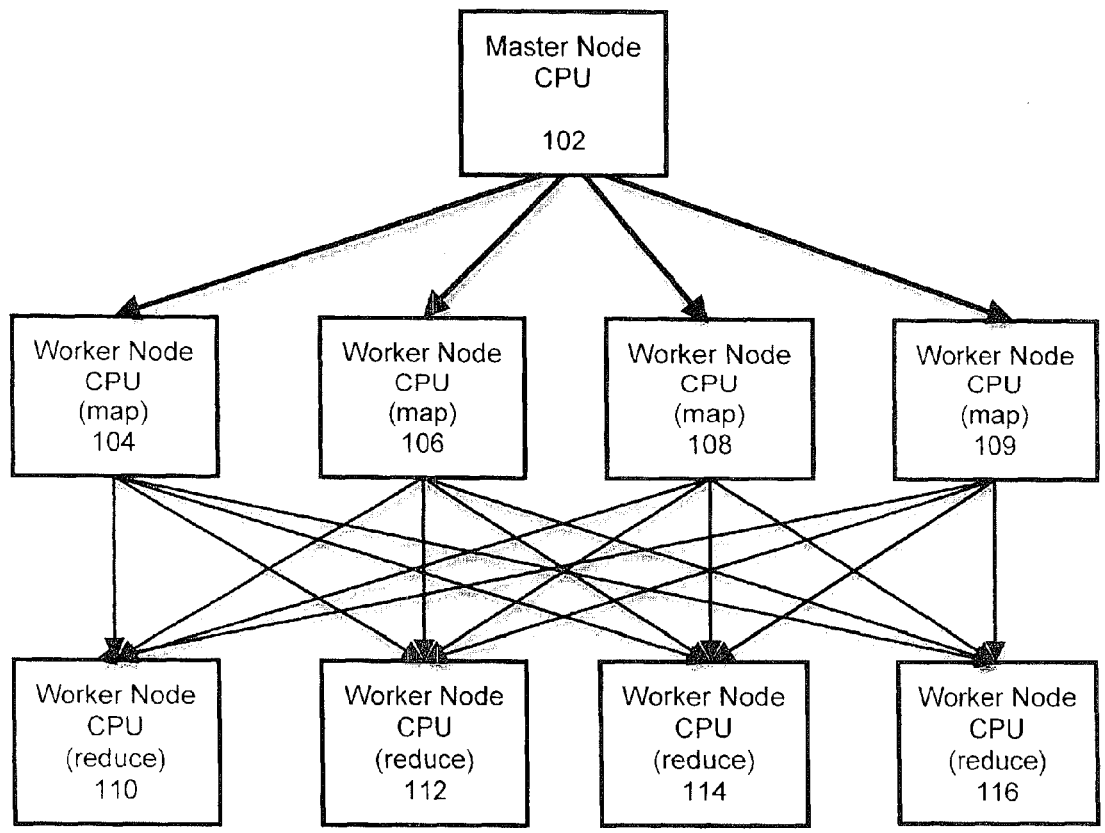
FIG. 1 is a diagram of a computer network that implements embodiments of a density-based clustering algorithm using Map-Reduce to solve large-scale graph problems.

FIG. 1 is a diagram of a computer network that implements embodiments of a density-based algorithm using Map-Reduce to solve large-scale graph problems. The system 100 of FIG. 1 implements a Map-Reduce model to solve large-scale graph problems. It also implements a reformulated version of the DBSCAN data clustering algorithm. Each node of system 100 represents a processor-based device or "machine" that may be embodied in a computer, workstation, server, client, mobile communication device, smartphone, tablet computer, laptop computer, or any other processor-based computing device. Each machine comprises a CPU (central processing unit) for execution of software instructions, and may include or be coupled to memory and one or more data stores. Each machine may also execute resident programs embodying client and/or server side embodiments of the density-based algorithm using Map-Reduce.

Map-Reduce is a distributed computing model that processes large data sets on clusters of computers in parallel. It provides a programming model which users can specify a map function that processes a key/value pair to generate a set of intermediate key/value pairs, and a reduce function that merges all intermediate values associated with the same intermediate key. FIG. 1 illustrates an embodiment in which system 100 comprises a master node and a number of worker nodes arranged in a two-tier centralized control model, though other arrangements are possible. For the embodiment of FIG. 1, to implement Map-Reduce, the master node 102 takes the input, partitions it up into smaller sub-problems, and distributes them to any number of worker map nodes 104 to 109. This constitutes the "map" step, and some of the worker nodes may do this again in turn. In the reduce step, the master node 102 assigns a certain range of keys, which are collected from the map stage to each reduce worker 110-116. Then every worker with a reduce task fetches answers of sub-problems from other workers according to the keys and combines them to form the output. In general, Map-Reduce allows for distributed processing of the map and reduction operations.

DBSCAN (Density-Based Spatial Clustering of Applications with Noise) is a data clustering algorithm that can be performed on graphs. It implements a density-based clustering algorithm by finding a number of clusters starting from the estimated density distribution of corresponding nodes (vertices). DBSCAN is an efficient algorithm when clustering data on a single machine. However, present implementations of graph processing using DBSCAN are limited to processing nodes one at a time on a single machine, and calculating the density of each node along a branch of nodes that are of the same density. This severely limits the efficiency and processing speed of systems dealing with large graphs and prevents real-time processing of these graphs.

Embodiments are directed to a system that implements DBSCAN using Map-Reduce as a model that can accelerate the clustering calculation of large graphs using a similar density-based model. The original graph is partitioned into a number of partial clustered graphs. Each partition is processed on a respective machine in a networked system so that multiple partitions of the original graph are processed in parallel. The sub-clusters comprising each of the partial clustered graphs are the merged using message-based mechanism that reduces unnecessary processing of redundant edges or node connections.

In an embodiment, the network 100 of FIG. 1 implements a density-based algorithm using Map-Reduce to form a new scalable algorithm that can achieve the same result compared to present DBSCAN implementations, but at a much greater process speed for large graphs. This essentially is an improved reformulation of DBSCAN, and is referred to as a "density-based algorithm using Map-Reduce." The original DBSCAN algorithm is decomposed into density-based filter (DBF) and partial connectivity detector (PCD), and these processes are then performed on partitions of a large graph. Functions, such as message sender (MS), edge cutting (EC), merge procedure (ME), and message mining (MM) will be used to speed up the merge of result from different partitions. This method generally results in termination less than log(N) merge jobs when using the ME component, and log(P) merge jobs when using ME and MM components together, where N is the diameter of Partial Clustered Graph, and P is number of graph partitions.

Each node or "machine" of network 100 includes a respective execution component for the density-based algorithm using Map-Reduce, such that the original large graph is partitioned into a number of smaller partitions and each partition is processed using a single machine of the network. The number and size of partitions can be selected based on the number of machines in the network, and can be determined based on a random or rule-based selection process. It should be noted that the system 100 is intended to be an example of a multi-processor or multi-machine network that processes large graphs using the density-based algorithm using Map-Reduce, and that any appropriate network topography may be used depending on the constraints and requirements of the graph or application being processed.

Figure 2:
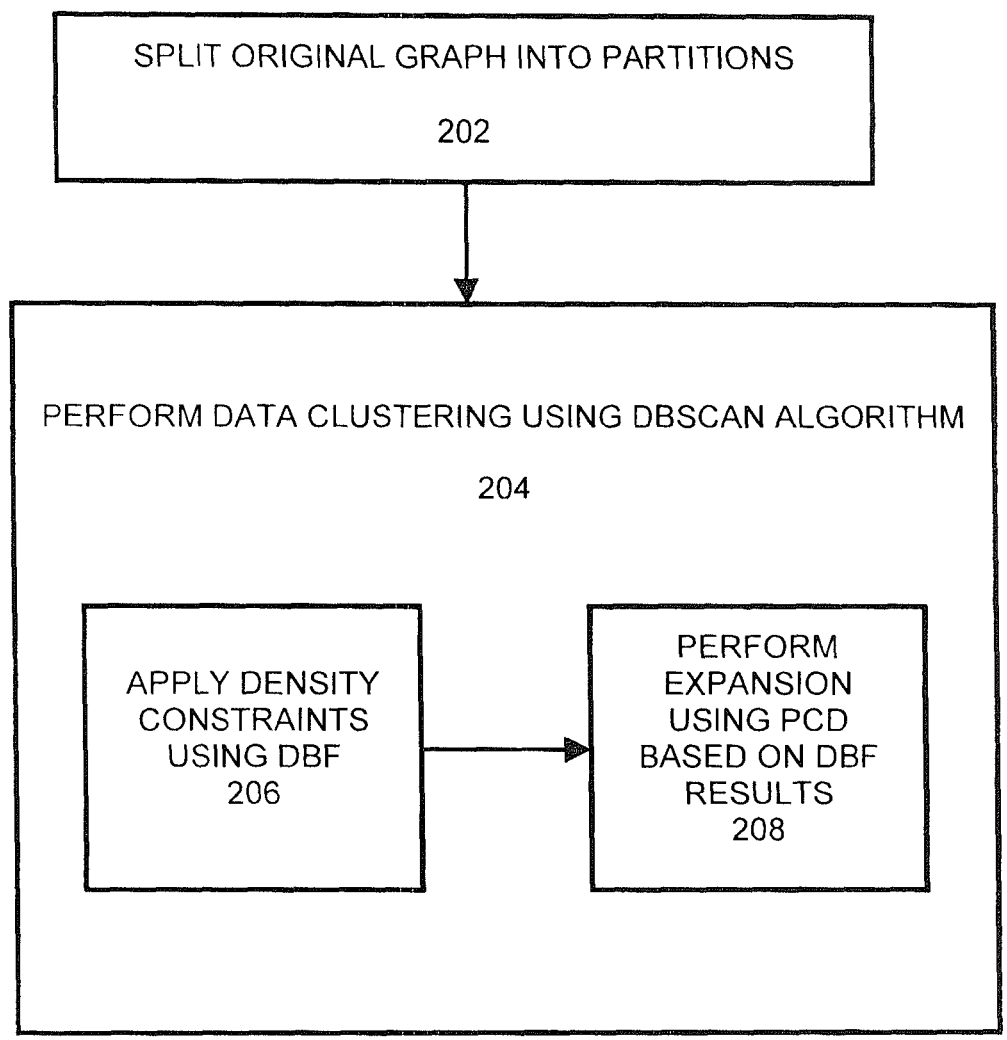
FIG. 2 is an overall flow diagram illustrating a method of implementing a density-based clustering algorithm using Map-Reduce, under an embodiment.

FIG. 2 is an overall flow diagram illustrating a method of implementing a density-based clustering algorithm using DBSCAN, under an embodiment. As shown in FIG. 2, to make the algorithm scalable, original graph is split into different partitions, step 202. The methods of splitting can be performed by various functions, such as by ID order, by hash-function and so on. This splitting function (SF) will be shared among all of the machines of the network to do message routing and is essential for load balancing of the algorithm. The function should not make all of the small IDs in one partition. In an embodiment, the PartitionID is set equal to the NodeID mod number of partitions.

As shown in step 204, the data clustering process is then implemented using a DBSCAN algorithm that is divided into two parts: a DBF function 206 and a PCD function 208. This task split makes it more efficient to execute the DBSCAN algorithm on Map-Reduce platforms. The DBSCAN algorithm will apply density constraints and do expansion at the same time. In an embodiment, the density constraints will be applied in the DBF function, step 206, and the expansion operation is performed in PCD function based on the result of DBF filter operation, step 208.

Figure 3:
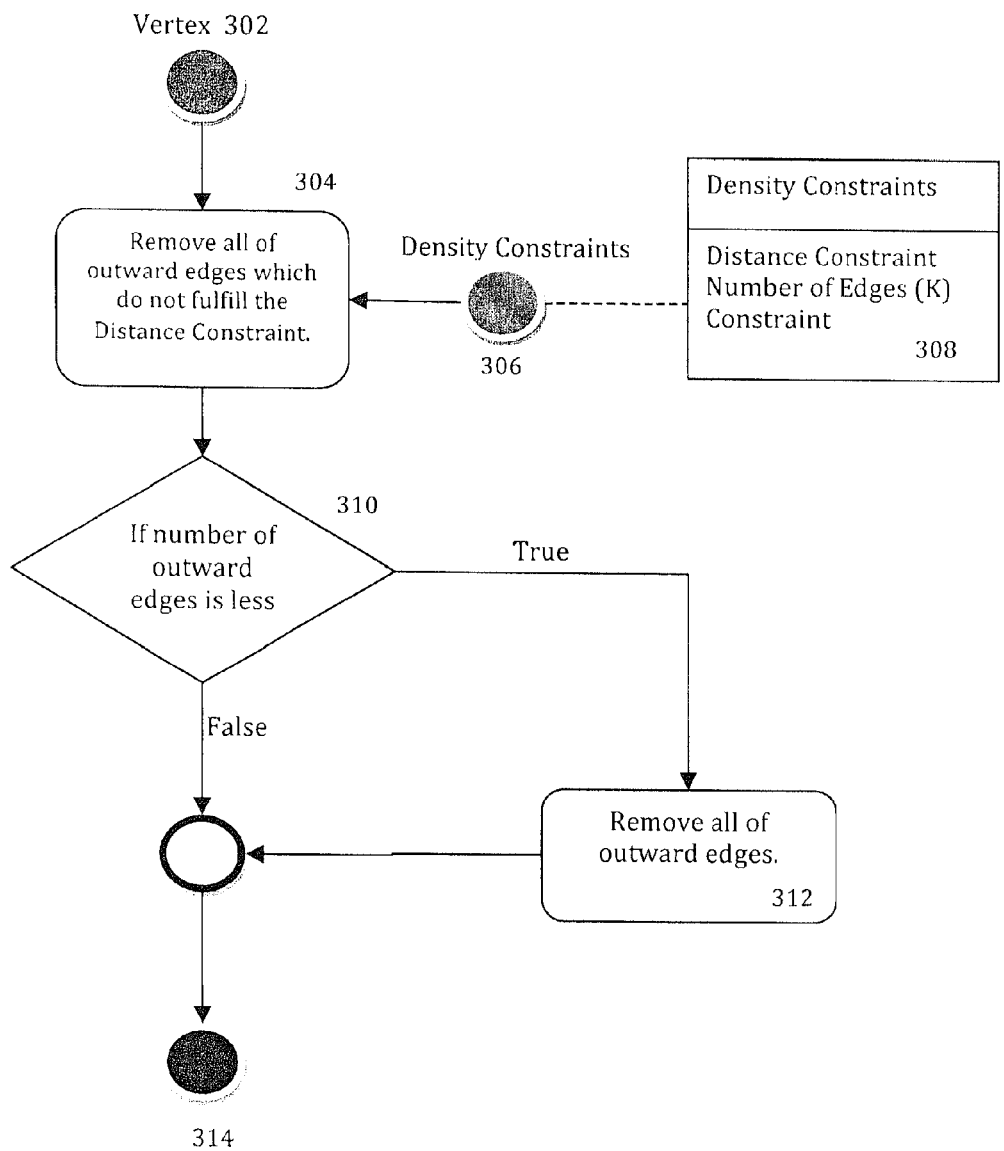
FIG. 3 is a flow diagram illustrating the workflow of a Density-Based Filter (DBF) that can transform the density-based problem into a connectivity problem, under an embodiment.

For the embodiment of FIG. 2, a density-based filter is used at the beginning of the algorithm to transform the density-based clustering problem into a connectivity problem. FIG. 3 is a flow diagram illustrating how the density constraints are applied on a partition of a graph in a density-based filter (PDF) process, under an embodiment. Each machine of a network 100 of machines will take a partition of the graph as input to a respective DBF process. The vertices 302 in a partition will be processed one-by-one by each respective machine. If the vertex has enough neighbors within defined distance, which is claimed in constraints 308, this vertex will only keep the edges pointing to these neighbors, otherwise, all of outward edges will be removed, block 304. In DBSCAN terminology, only core nodes will have outward edges after filtering, edge nodes (border nodes) and noises will not have any outward edges. Thus, the process in block 304 determines whether or not the number of outward edges is less than a pre-defined threshold number. If this is true, the outward edges are removed, block 312. The process then provides DBF output 314.

Figure 10:
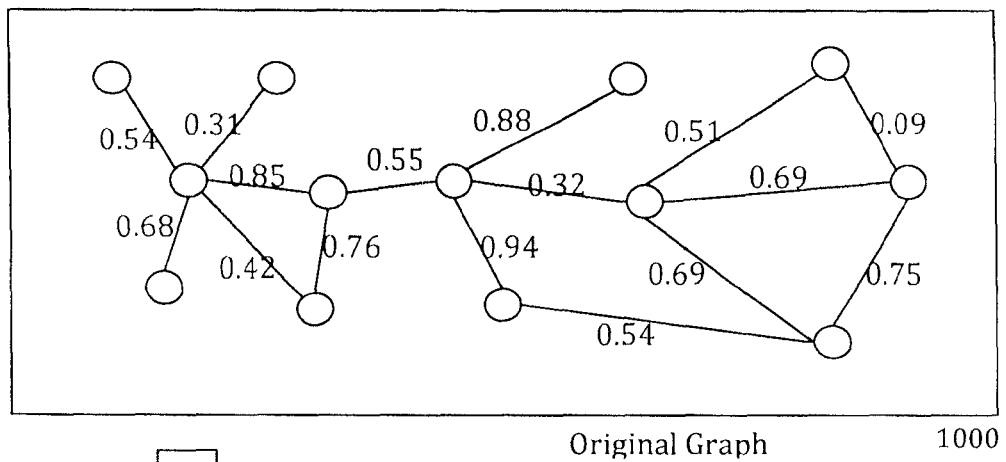
FIG. 10 is a diagram illustrating an example of a DBF process executed on an original graph to produce a filtered graph.
Figure 10:
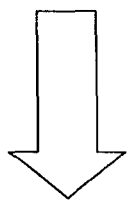
Figure 10:
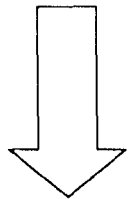
Figure 10:
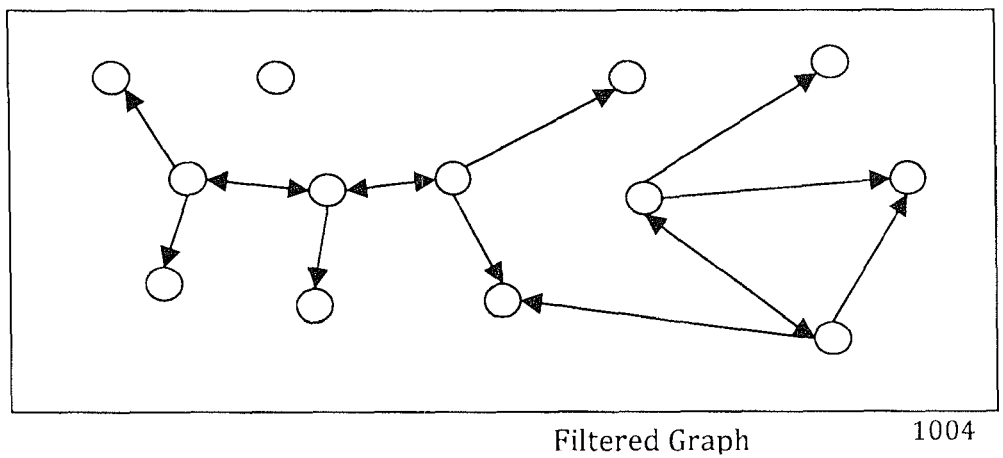

FIG. 10 is a diagram illustrating an example the generation of a filtered graph from an original graph, using a DBF process, under an embodiment. As shown in FIG. 10, an original graph comprising nodes and edges having probability values is processed by a density-based filter process 1002. The density-based filter process has certain defined density constraints, for example, K>=3, and $\epsilon$>=0.5. Based on the constraint values, the density-based filter process 1002 then produces a filtered graph 1004. In a practical implementation, the DBF process works in the mapper of a first job. In the example of FIG. 10, according to the density constraints, all of edges with a weight smaller than 0.5 are removed. Then, the nodes that have more than three edges become core nodes that can point the edges to rest of neighbors. The nodes that do not have enough neighbors are not allowed to point to any other node.

Figure 4:
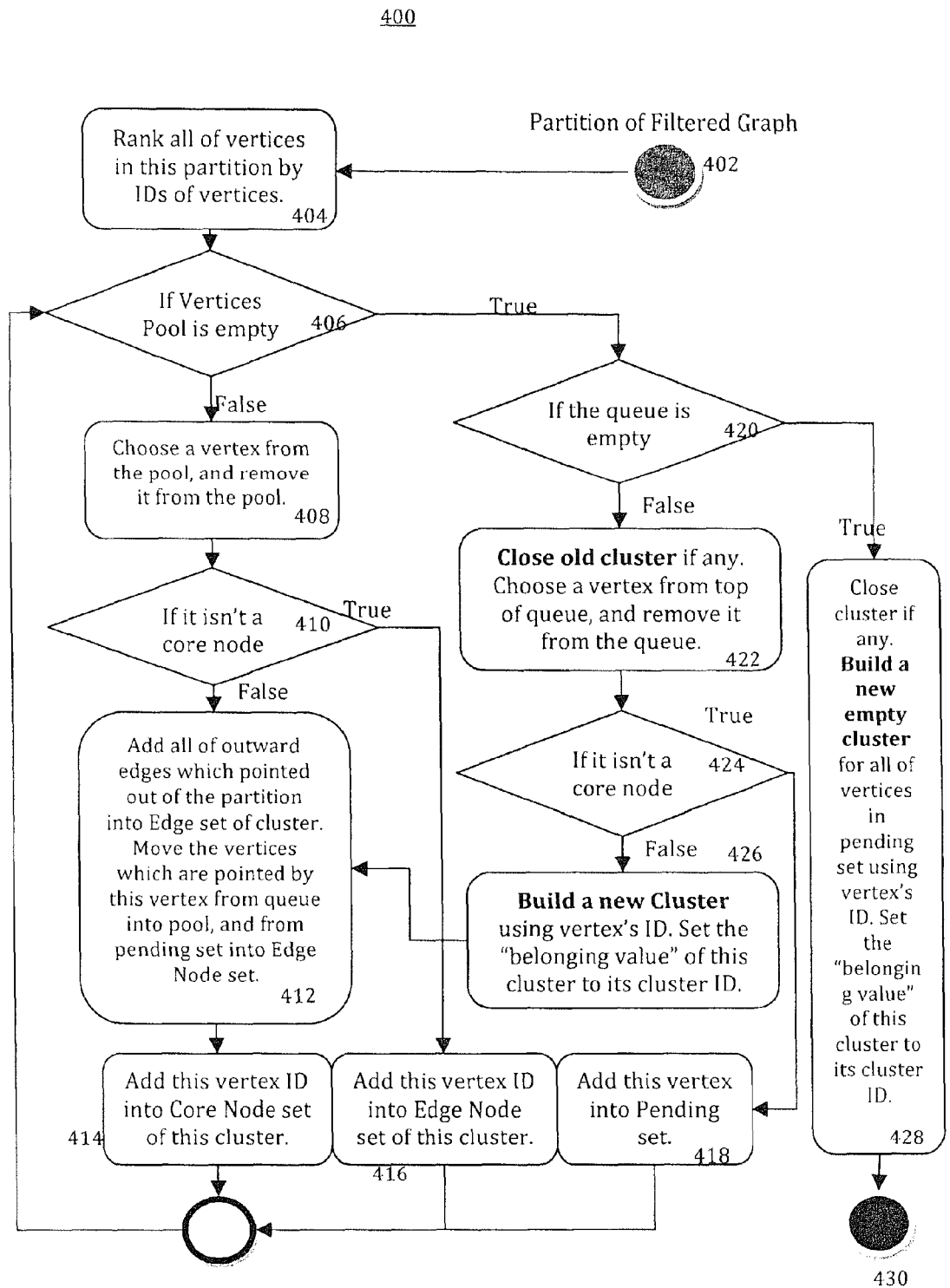
FIG. 4 is a flow diagram illustrating the workflow of Partial Connectivity Detector (PCD) that detects connectivity and generates clusters inside each a partition of graph, under an embodiment.

After the DBF process 300 of FIG. 3 completes, the original graph will be transformed into a directional un-weighted graph in partitions, and each of these partitions will be processed by partial connectivity detector process on its own machine. FIG. 4 is a flow diagram illustrating the workflow of a partial connectivity detector (PCD) that detects connectivity among nodes and produce clusters within each partition of graph, under an embodiment. Through process 400, the partitions of the filtered graph are clustered into a plurality of sub-clusters. As shown in FIG. 4, the connectivity of each of the filtered graph partitions 402 will be found out by graph-traversal through edges. In the result, all of the clusters will have the following six states:
1. Cluster ID: indicates the ID of a particular cluster, and also the smallest ID of core nodes in the cluster. If there is no core node, the Cluster ID will be the ID of edge node or noise.
2. IDs of Core Nodes (Core Node set): contains all of the IDs of the core nodes in the cluster.
3. IDs of Edge Nodes (Edge Node set): contains all of the IDs of the edge nodes in the cluster.
4. IDs of Edges (Edge set): contains all of the IDs of edges that pointed out of a particular graph partition from the cluster.
5. Belonging Value: indicates which cluster the particular cluster will ultimately be merged into.
6. Active or Halt: indicates whether the cluster is active or not.

As shown in FIG. 4, the process 400 begins with all of the vertices of each partition 402 being ranked in order of their ID's, block 404. If the vertices pool is empty, as determined in decision block 406, the process checks if the queue is empty, decision block 420. If the queue is empty, the cluster is closed and a new empty cluster is built for all of the vertices in the pending set using the vertex's ID. The "belonging value" of this cluster is then set to its cluster ID, block 428. The output 430 is then generated, which is sub-cluster or sub-cluster(s) into which the original partition 402 is clustered. If, in decision block 406 it is determined that the vertices pool is not empty, a vertex is selected and removed from the pool, block 408. It is then determined whether or not this is or is not a core node, block 410. If it is a core node, the vertex ID is added into the edge node set of the cluster, block 416, and the process proceeds to check again whether the remaining vertex pool is empty, block 406. If, in block 410 it is determined that it is not a core node, all of the outward edges that pointed out of the partition are added into the edge set of the cluster. The vertices that are pointed to by the vertex are moved from the queue into the pool and from the pending set into the edge node set, block 412. The vertex ID is then added into the core node set of the cluster, block 414, and the process proceeds to check again whether the remaining vertex pool is empty, block 406. If, in block 420 it is determined that the queue is empty, after it is determined that the vertices pool is empty, block 406, the process closes the old cluster, and selects a vertex from the top of the queue and removes it from the queue. Block 424 then determines whether or not the node is a core node. If so, the vertex is added to the pending set, block 418, and the process proceeds to check again whether the remaining vertex pool is empty, block 406. If, in block 424 it is determined that the node is not a core node, a new cluster is built using the vertex's ID. The "belonging value" of the cluster is then set to the cluster ID, block 426, and the process proceeds from block 412. Ultimately, upon completion of process 400, the original partition 402 of the filtered graph is clustered into a plurality of sub-clusters.

Figure 11:
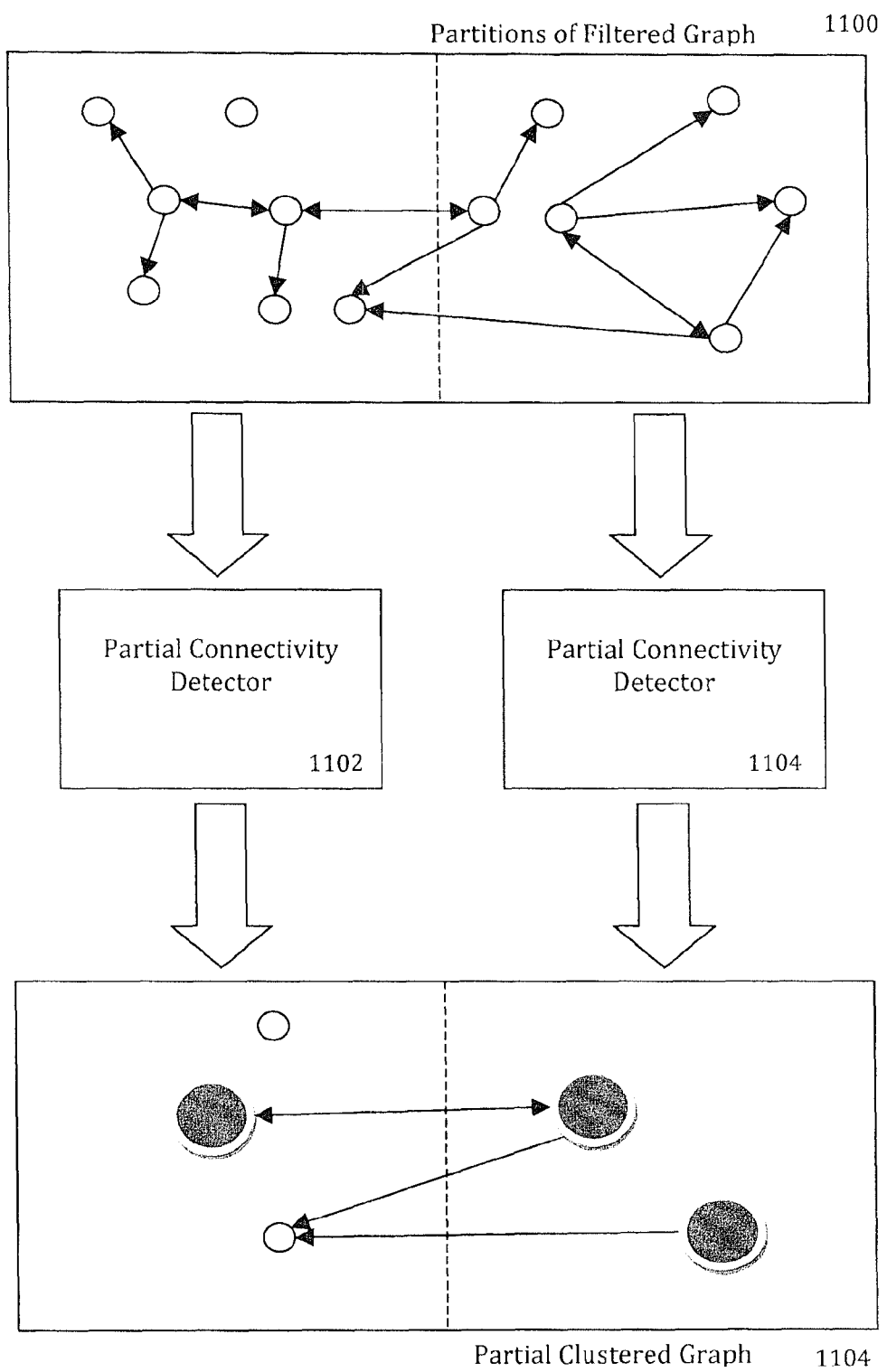
FIG. 11 is a diagram illustrating an example of a PCD process executed on the partitions of a filtered graph to produce a partial clustered graph.

FIG. 11 is a diagram illustrating an example of a PCD process executed on the partitions of a filtered graph to produce a partial clustered graph, under an embodiment. As shown in FIG. 11, the two partitions of a filtered graph 1100 are each processed through respective PCD processes 1102 and 1103. These produce partial clustered graph 1104 comprising two sub-clusters, each produced by the separate PCD process. A filtered graph may be divided into any practical number of partitions. As shown for the example of FIG. 11, assuming the filtered graph is divided into two partitions, the PCD process will is performed on each of them independently. The cluster is identified as all nodes that are connected together in one partition. The result shows there are three clusters in the left partition, and one of them contains a core node. In the right part, there are two clusters, and both of them contain core nodes. There are also some edges remaining between the clusters in different partitions.

The result of the PCD process of FIG. 4 are a number of sub-clusters 1104, as shown in FIG. 11. At this point, all of the belonging values are the same as the cluster IDs and every cluster is active. To produce a solution for the entire original graph, the sub-clusters must be merged. The object of the merge operation is to share the belonging values of the clusters as soon as possible. Once the belonging value of a cluster is changed, it will broadcast this new value to all of its neighbors. In general, this procedure would need N iterations where N is the diameter of partial clustered graph when using a simple broadcast mechanism. In an embodiment, the density-based algorithm utilizes certain message transmission and mining techniques to achieve log(N) iterations on merge, or log(P) iterations where P is number of partitions of graph.

As mentioned above, the process utilizes a message-based mechanism to merge the sub-clusters. This mechanism allows each sub cluster to send a message to the other sub-clusters indicating that it needs to be merged. Each sub-cluster waiting to be merged is thus messaged and merged with other sub-clusters. The messaging structure allows sub-clusters to know each of their neighbors and indirectly couple or "introduce" neighboring sub-clusters to its other neighbors. This messaging system allows the comprehensive and effective merging of sub-clustered generated by many different parallel processes executed on dedicated machines in the network.

Figure 5:
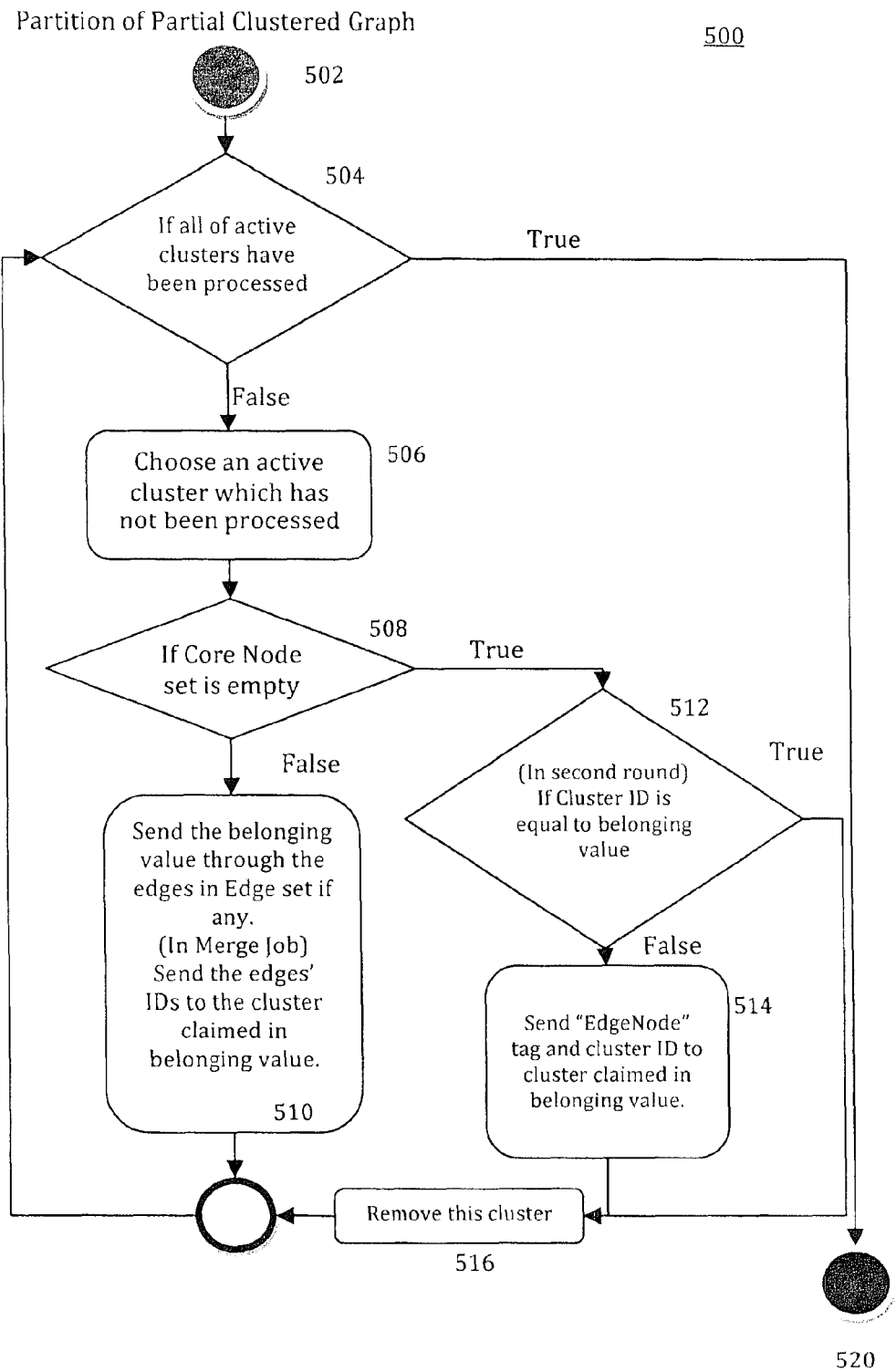
FIG. 5 is a flow diagram illustrating the workflow of message sender (MS) that sends messages according to states of clusters, under an embodiment.

FIG. 5 is a flow diagram illustrating the workflow of message sender (MS) that sends messages according to states of clusters, under an embodiment. Messages are sent when a particular cluster is active and this helps to reduce a large amount of network traffic. A splitting function is used to find out where a target cluster is located. All of the clusters with at least one core node will send the belonging value to all of its neighbors except the one it belongs to or itself. This cluster will also send all of its neighbors to the neighbor it belongs to. In the second round of messages sending, if the cluster does not have any core nodes in it and it is not belonging to itself, a message will be sent to its belonging cluster to claim that it is an edge node and wants to be merged. All of clusters without core nodes will then be removed from the graph.

As shown in FIG. 5, the process 500 begins by taking each partition of the partial clustered graph 502 and determining whether or not all of the active clusters have been processed, decision block 504. If there remain unprocessed clusters, the process selects an active cluster that has not been processed, block 506 and then determines whether or not the core node set is empty, decision block 508. If the core node set is not empty, the belonging value is sent through the edges in the edge set, block 510. The process then proceeds on the next active cluster. If, in block 508 it is determined that the core node is empty, in the second round, it is determined whether the cluster ID is equal to the belonging value, block 512. If not, the edge node tag and cluster ID is sent to the cluster claimed in the belonging value, block 514. The cluster is then removed, 514, and the process then proceeds on the next active cluster. The process then terminates 520 when all active clusters have been processed, as determined in block 502 and clusters without core nodes are removed from the graph.

Figure 6:
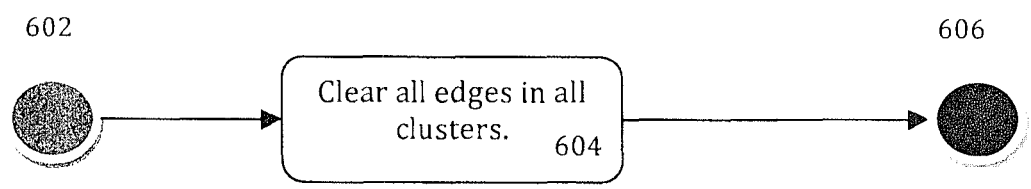
FIG. 6 is a flow diagram illustrating the workflow of an edge cutting (EC) process that removes all of edges in clusters, under an embodiment.

Prior to processing received messages the first time, unnecessary edges may be removed to speed processing. FIG. 6 is a flow diagram illustrating the workflow of an edge cutting (EC) process that removes all unnecessary edges in clusters, under an embodiment. In process 600, execution block 604 removes all of the edges from clusters for each partition of the partial clustered graph, 602. The purpose of this process is that there might be more than one connection between two clusters, and sending messages through all of these edges is not necessary and will cause high network traffic. After removing all of the edges process 600 terminates, block 606, and new edges will be built according to the received messages to guarantee more efficient message passing.

Figure 7:
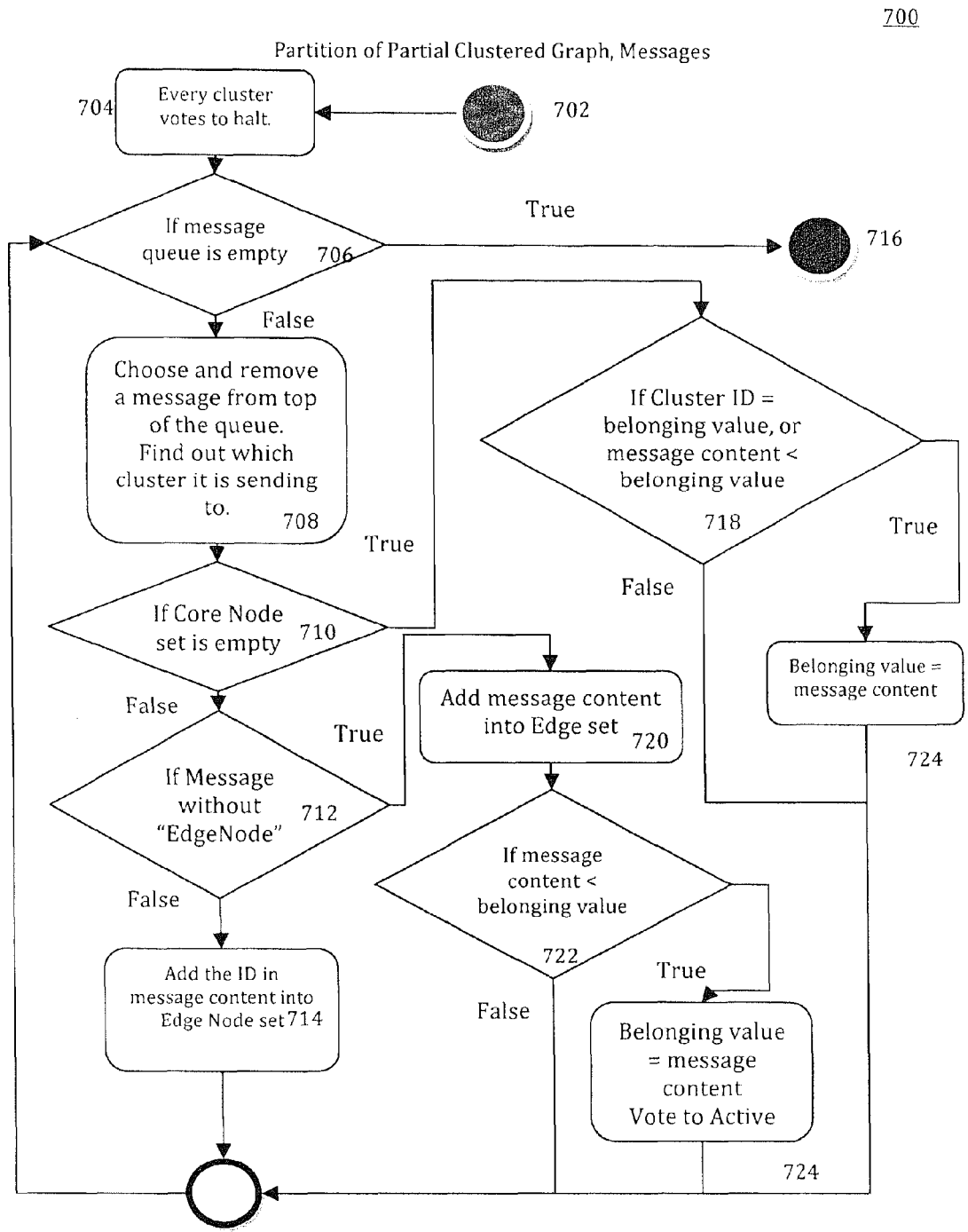
FIG. 7 is a flow diagram illustrating the workflow of a merge procedure (ME) that revises the belonging value of clusters and adds extra edges on clusters to achieve fast termination, under an embodiment.

The procedure of building edges will be described with reference to FIG. 7. FIG. 7 is a flow diagram illustrating the workflow of a merge procedure (ME) that revises the belonging value of clusters and adds extra edges on clusters to achieve fast termination. The merge procedure performs certain steps based on a merge round, which are organized into every round, the first round of a merge, and the second round of a merge. For every round of a merge, when a cluster with core nodes receives a message with a cluster ID, it will take this cluster ID as its neighbor and add it in to edge set if it is not its neighbor before. If the ID is smaller than its own belonging value, the belonging value will be changed to this ID and the node will then set its own state to active.

For every first round of a merge, when a cluster without core node receives a message with a cluster ID, if this cluster is belonging to itself or its belonging value is larger than this ID, it will take this ID as the belonging value and set its own state to active.

For every second round of a merge, when a cluster with core nodes receives a message with cluster ID with a tag that indicates it is an edge node, it adds this ID into its edge node set.

With reference to process 700 of FIG. 7, the process begins with the messages for each partition of the partial clustered graph, 702. Initially every cluster votes to halt, block 704. The process then determines whether the message queue is empty, decision block 706. If so, the process terminates 716. If the message queue is not empty, the message from the top of the queue is selected and removed from the queue, and the process determines to which cluster the messages is being sent, block 708. The process determined whether or not the core node set is empty, decision block 710. If the core node set is empty, then it is determined whether or not the cluster ID equals the belonging value, or if the message content is less than the belonging value, as determined in decision block 718. If so, the belonging value is set to the message content, and the process proceeds with the next message from decision block 706. If, in block 710 it is determined that the core node is not empty, the process next determines whether or not the message is without an edge node, block 712. If not, the ID in the message is added into the edge node set, block 714, and the process proceeds from the next message. If the message is with the edge node, the message content is added into the edge set, block 720. The process then determines if the message content is less than the belonging value, decision block 722. If so, the belonging value is set to the message content and the node vote is set to active, block 724. The process then proceeds with the next message in the message queue until the message queue is empty.

After process 700 of FIG. 7 is complete, all of the redundant edges are removed. The number of edges can be increased while running more iterations of merge. The increased number of edges speed up the message broadcasting, and can make sure the correct value is reached for every cluster in log(N) iterations.

Figure 12:
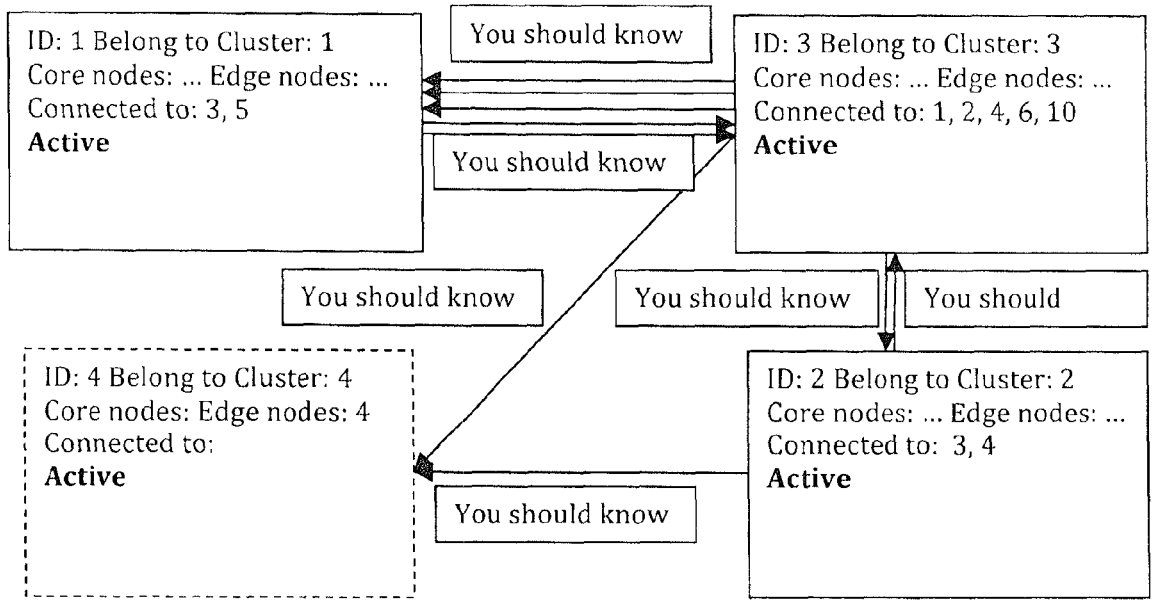
FIG. 12 is a diagram illustrating an example of an instance of message sending, redundant edge cutting, and first round of cluster merging.
Figure 12:
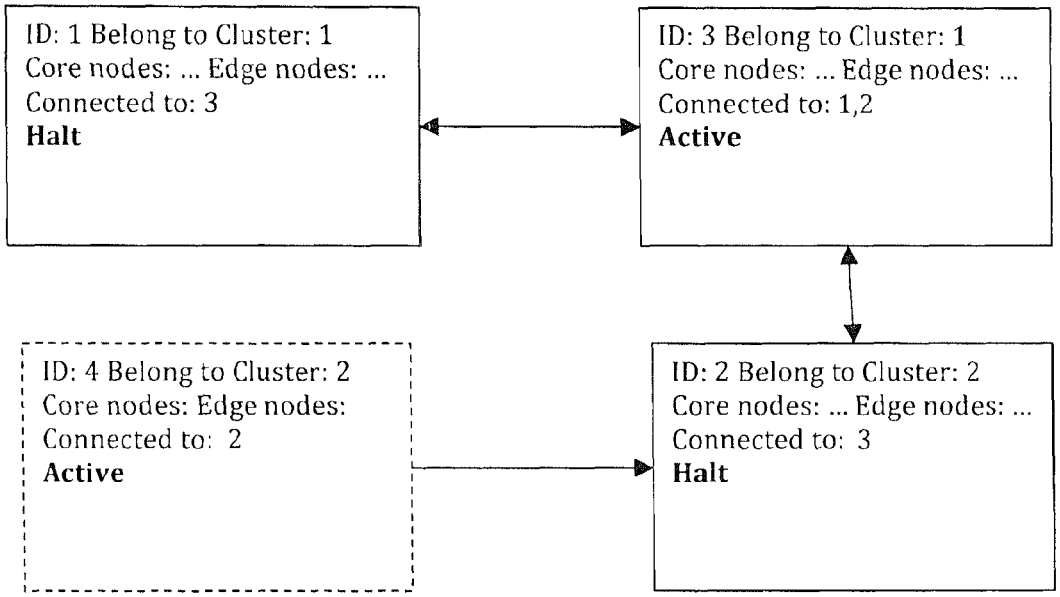

FIG. 12 is a diagram illustrating an example of an instance of message sending, redundant edge cutting, and first round of cluster merging. The example of FIG. 12 shows the first round of a merge including edge cutting. As shown in the first part of the example 1202, there are multiple edges between cluster 1 and cluster 3, after the edge cutting and merging operations only one bidirectional edge remains, as shown in group 1204. The cluster 2 has discarded the connection to cluster 4 since cluster 4 does not have any core node and outward edge to send out a message. However, cluster 4 now is pointed to by cluster 2, because it received a message from it.

Figure 13:
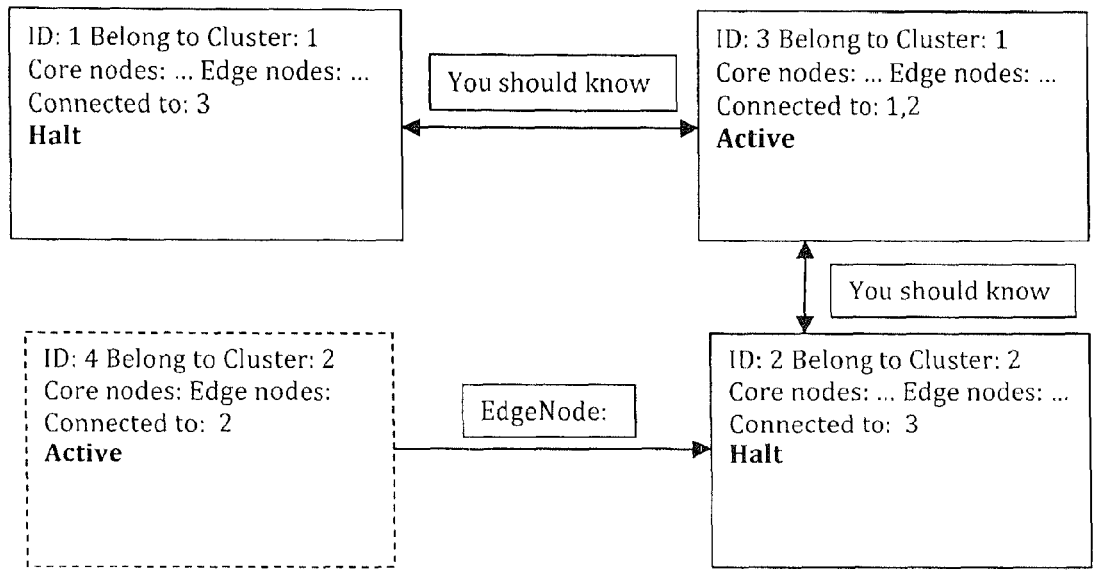
FIG. 13 is a diagram illustrating an example of how a subsequent merge procedure is performed after the first round of merging in the example of FIG. 12.
Figure 13:
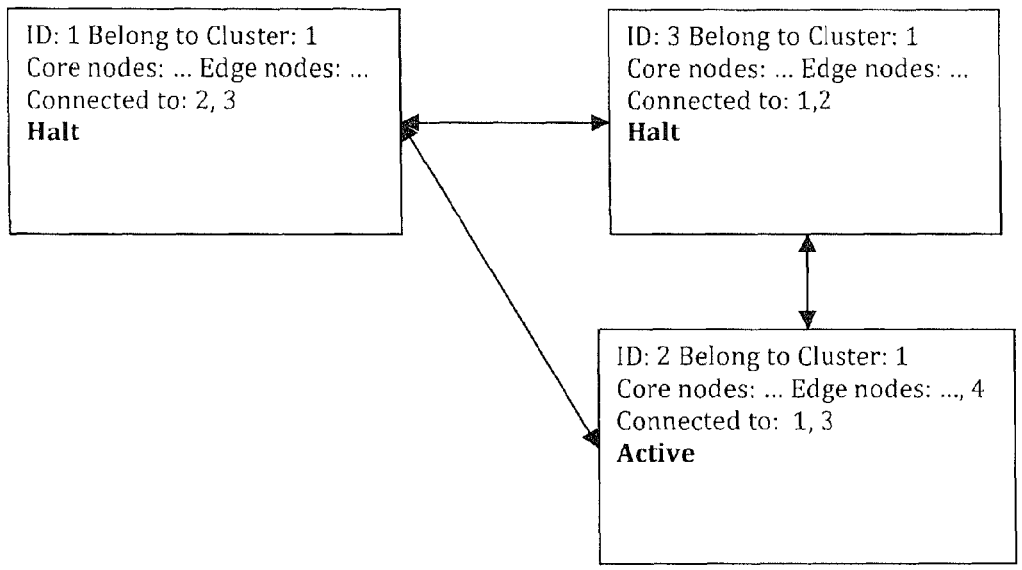

FIG. 13 is a diagram illustrating an example of how a following merge procedure is performed after the first round of merging in the example of FIG. 12. As shown in group 1303, since cluster 3 and 4 have changed their belonging value, they are active to send a message out. Cluster 3 introduced cluster 1 to cluster 2 and cluster 2 to cluster 1 as indicated by the "you should know" box(es). Thus, cluster 1 and 2 are introduced and will know each other, and take each other as neighbors. Cluster 4 sent a message to join cluster 2, so, after the procedure, cluster 4 is removed and node 4 becomes an edge node of cluster 2, as shown in group 1304. After this, cluster 2 has changed its belonging value to 1, and its state is active.

In an embodiment, a message mining technique is used to accelerate the merging process. The message mining technique is based on the following facts: When one cluster in the graph partition changed its belonging value, other clusters that had the same belonging value before can also be changed. For example, if node A sent messages to nodes E and F, and node B sent messages to nodes F and G, it means that A,B,E, F,G are in the same cluster (A,B,E,F,G are clusters with core nodes).

Message mining is performed by grouping a bipartite graph wherein the left part of the graph consists of the IDs in the content of messages, and the belonging values in clusters; and the right part of the graph consists of the "To" values in the messages and clusters' IDs. Grouping of this bipartite graph can be done by traversal of the graph. After grouping, there will be no connections between each group; then for one group, the process makes the edges fully connected between left and right parts, and reverses the graph into messages. These new messages are taken as input of merge procedure.

All of the original messages are included into new ones, and the extra information can be used to accelerate the merge procedure to log(P).

Figure 8:
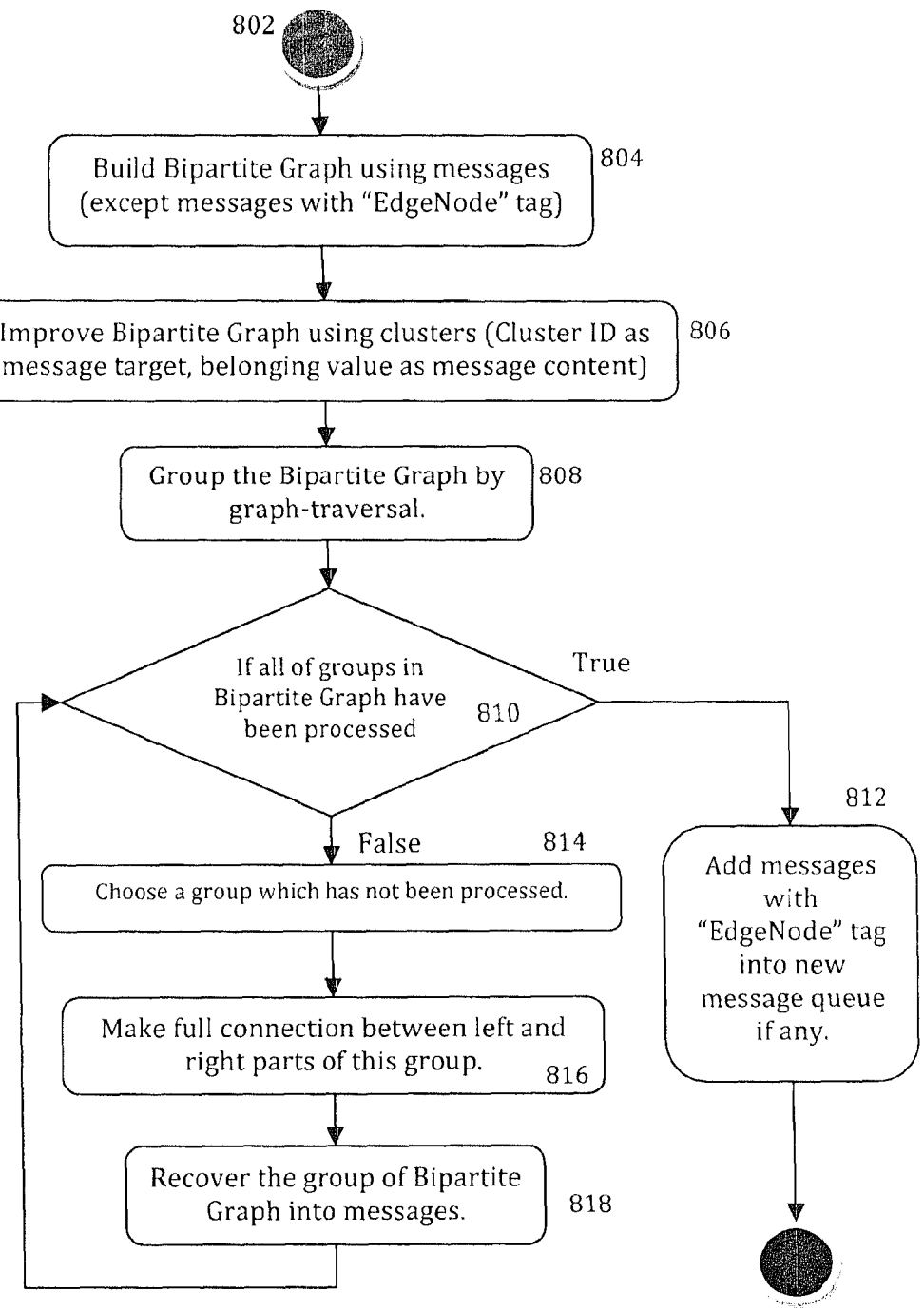
FIG. 8 is a flow diagram illustrating the workflow of message mining (MM) procedure that finds extra information from messages and can be used to accelerate message processing, under an embodiment.

FIG. 8 is a flow diagram illustrating illustrates the workflow of message mining (MM) procedure that finds extra information from messages and can be used to accelerate message processing, under an embodiment. As shown in process 800, the messages 802 are used to build a bipartite graph, 804. The bipartite graph is improved using clusters with the cluster ID as the message target and the belonging value as the message content, block 806. The bipartite graph is then grouped using graph traversal, block 808. The process next determines ether or not all of the groups in the bipartite graph have been processed, decision block 810. If all groups have been not been processed, the process chooses a group that has not been process, block 814, and makes a full connection between the left and right parts of the group, block 816. The chosen group of the bipartite graph are then recovered into messages, and the process proceeds to the next group. When all groups have been processed, as determined in block 810, the process adds messages with the edge node tag into the new message queue, and then the process terminates 800.

Figure 14:
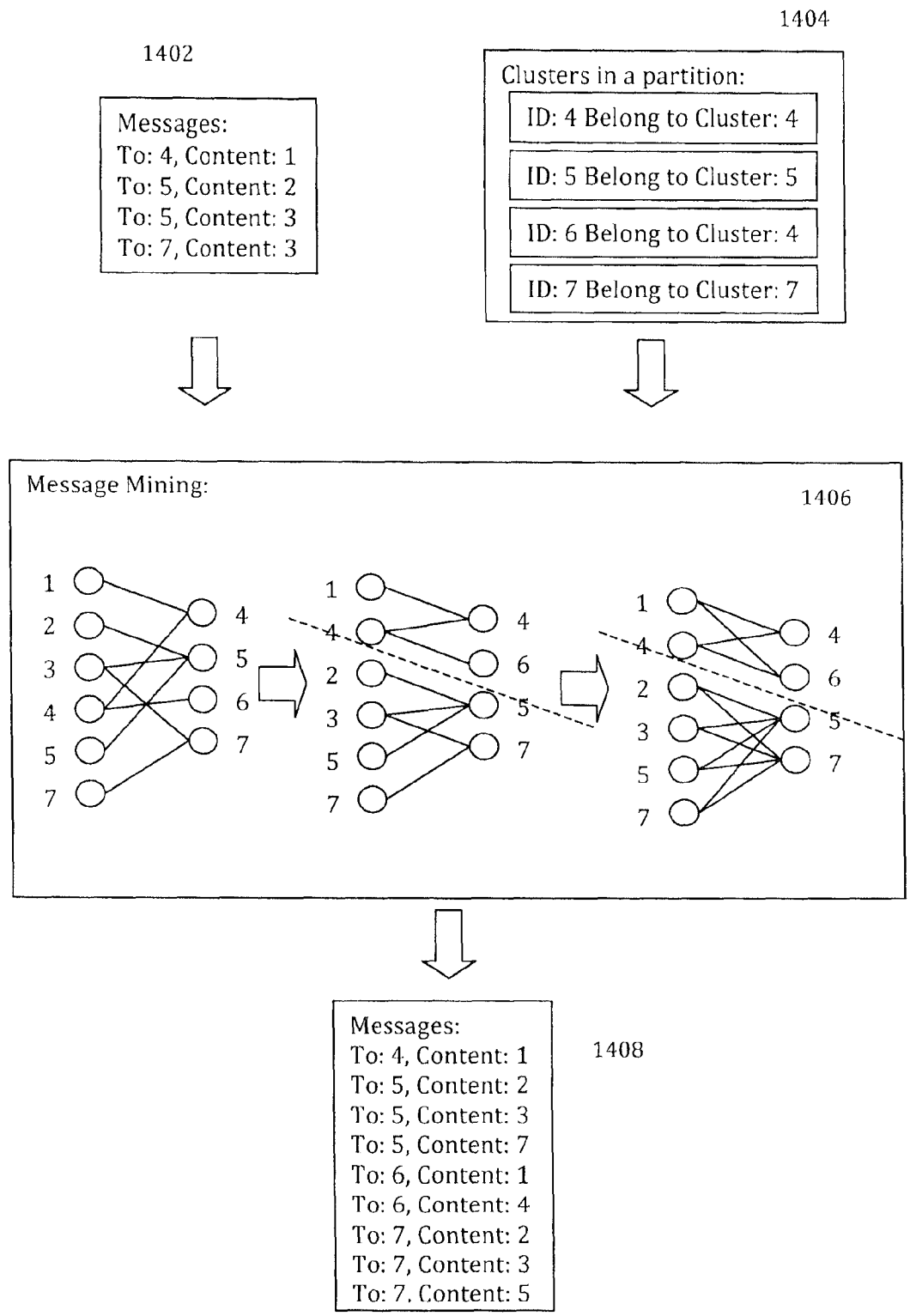
FIG. 14 is a diagram illustrating an example of a message mining technique to find new information using given messages and graph structure.

FIG. 14 is a diagram illustrating an example of an instance of a message mining technique to find new information using given messages and graph structure. As shown in FIG. 14, messages 1402 are converted into bipartite graph relations as follows: 1 to 4, 2 to 5, 3 to 5 and 3 to 7. The graph partition 1404 is converted into 4 to 4, 5 to 5, 4 to 6 and 7 to 7. Through message mining process 1406, the bipartite graph is grouped into $\{1,4\} \rightarrow \{4,6\}$ and $\{2,3,5,7\} \rightarrow \{5,7\}$. Full connections are made between left and right parts of the bipartite graph on individual groups. After reversing the graph to messages, five more messages are made. These extra messages will help make the results on different partitions merge faster.

Figure 9:
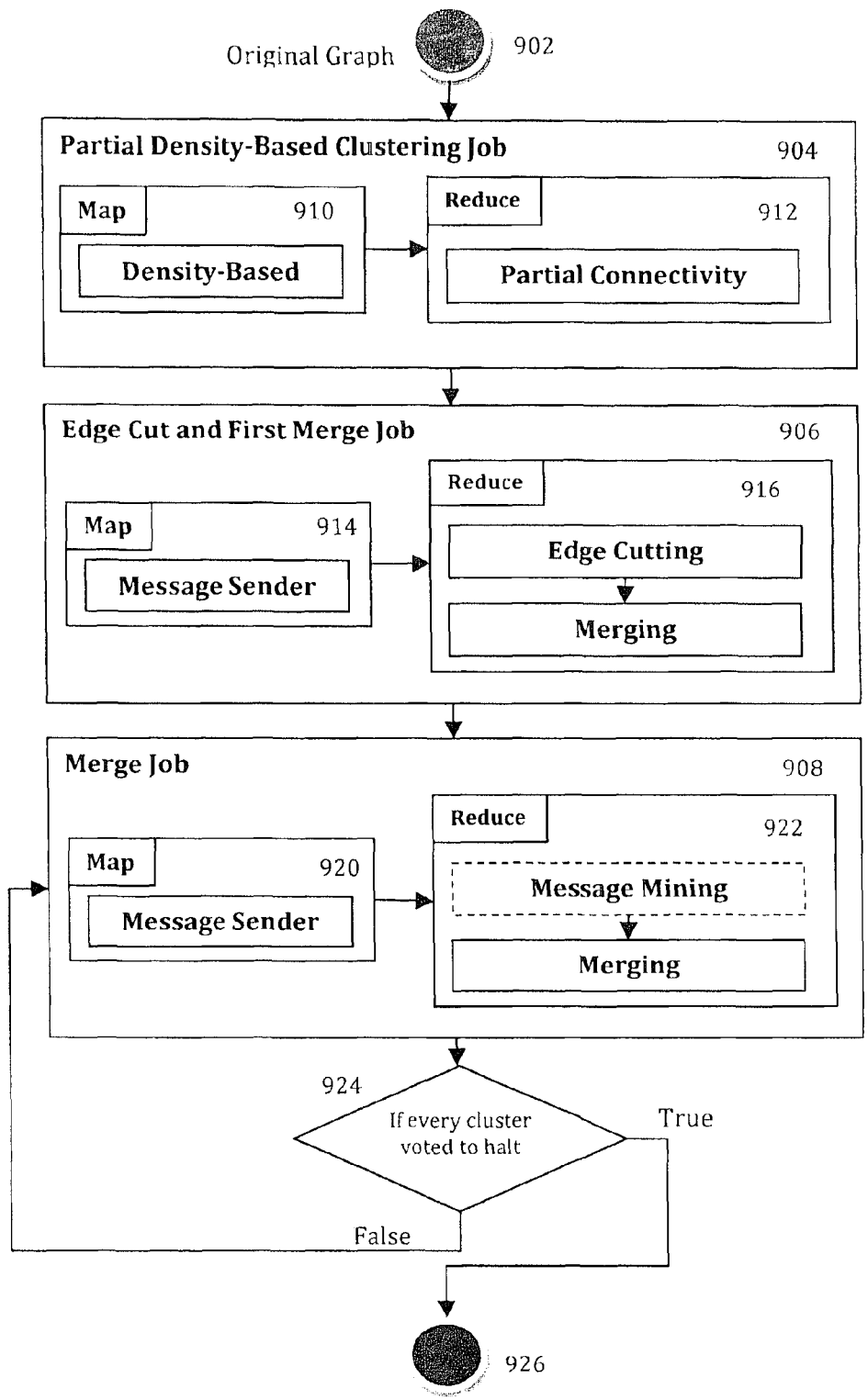
FIG. 9 is a diagram that provides an overview of the components and process flow for a density-based algorithm using Map-Reduce, under an embodiment.

FIG. 9 is a diagram that provides an overview of the components and process flow for a density-based algorithm using Map-Reduce, under an embodiment. To process an original graph 902, a DBSCAN procedure 904 is partially done on partition of the graph by DBF and PCD procedures in a mapper component 910 and a reducer component 912. After this, message sending and merging are performed in a second job 906. This second job includes edge cutting and a first merge process. The message sender process is part of the mapper component 914 of this job, while the edge cutting and merging processes are part of the reducer component 916. In subsequent merge jobs 908, fast merge operations are performed by adding edges. Message Mining also can be done optionally. The message mining and merging processes are part of the reducer component 922 in the subsequent job 908, while the message sender remains part of the mapper component 920. When all of clusters have voted to halt, the merge procedure can be terminated.

As described herein, the density-based clustering algorithm is an improvement to a straight implementation of DBSCAN to process large graphs. It decomposes and reformulates the original DBSCAN algorithm to make it possible to be performed on a Map-Reduce model using many machines in a networked architecture. It uses message passing and edge adding to increase the speed of result merging to log(N) iterations. It also uses message mining to further decrease the iteration number to log(P). The density-based algorithm using Map-Reduce is scalable, and can be accelerated by using more machines in the network. The active or halt state in the cluster and edge cutting reduce large amounts of network traffic. Optimum load balance among different machines in a network can be achieved by a splitting function.

The DBF and PCD processes together can be used to clustering data partially. The various combinations of message sending, edge cutting, merging, and message mining operations can be used to merge and cluster different kinds of graph-based data. Although embodiments have been described in relation to a design based on a Map-Reduce model, it should be noted that implementation is not limited only to the Map-Reduce model. Embodiments of the density-based model using the DBF, PCD processes with any or all of the message sending, edge cutting, merging, and message mining operations can be migrated to other distributed or multi-core platforms, as well.

Aspects of the system 100 may be implemented in appropriate computer network environment for processing large graph data, including a cloud computing environment in which certain network resources are virtualized and made accessible to the individual nodes through secure distributed computing techniques. The Map-Reduce system described herein can be implemented in an Internet based client-server network system. The network 100 may comprise any desired number of individual machines, including one or more routers (not shown) that serve to buffer and route the data transmitted among the computers. Network 100 may be built on various different network protocols, and may be the Internet, a Wide Area Network (WAN), a Local Area Network (LAN), or any combination thereof.

According to one embodiment, each machine of network 100 is operator configurable using applications, such as a web browser, including computer code run using a central processing unit. A computer program product embodiment includes a machine-readable storage medium (media) having instructions stored thereon/in, which can be used to program a computer to perform any of the processes of the embodiments described herein. Computer code for executing embodiments may be downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

For the purpose of the present description, a data object is any type of distinguishable data or information, such as an image, video, sound, text, or other type of data. A data object may include multiple types of distinguishable data, such as an image combined with descriptive text, and it may also comprise a dynamic signal such as a time varying signal. A data object as used herein is to be interpreted broadly to include stored representations of data including for example, digitally stored representations of source information. A data set is a collection of data objects, and may comprise a collection of images, or a plurality of text pages or documents. A user is utilized generically herein to refer to a human operator, a software agent, process, or device that is capable of executing a process or control.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for processing a graph comprising graph data in a network comprising a plurality of individual processor-based machines, the method comprising:
    partitioning the graph into a plurality of partitions wherein the number of the plurality of partitions is a function of the number of the plurality of machines;
    assigning each partition to a respective machine of the plurality of machines by applying a splitting function to the graph data;
    applying a density-based filter to each partition to produce a plurality of partitions of a filtered graph, the density-based filter applies one or more density constraints to each partition such that vertices with at least a minimum number of neighboring nodes within a distance defined by the density constraints include nodes with edges pointing to neighboring nodes and vertices that do not have the minimum number of neighboring nodes within the distance defined by the density constraints do not include nodes with edges pointing to neighboring nodes;
    applying a partial connectivity detector process that detects connectivity between nodes to each of the partitions of the filtered graph to produce sub-clusters of nodes of the filtered graph based on the edges between the nodes; and
    merging the sub-clusters of nodes through a message based merge process.

2. The method of claim 1 wherein the splitting function uses a method selected from one of node ID and hash function.

3. The method of claim 1 wherein the step of applying a partial connectivity detector process comprises:
identifying all nodes in each partition that are connected to one another by at least one edge as a sub-cluster;
determining if each sub-cluster contains a core node; and
determining a belonging value for each sub-cluster, wherein the belonging value identifies which cluster a respective sub-cluster will be merged into.

4. The method of claim 3 further comprising performing an edge cutting operation that comprises:
identifying multiple edges between pairs of sub-clusters; and
removing all edges exceeding a single edge between a pair of sub-clusters if multiple edges exist between the pair of sub-clusters.

5. The method of claim 3 wherein the step of merging the sub-clusters further comprises:
establishing neighbor relationships among the sub-clusters based on the belonging value for each sub-cluster; and
assigning an active or halt state to each sub-cluster.

6. The method of claim 5 further comprising applying a message sending process that comprises:
broadcasting a message when a sub-cluster is in an active state, the message comprises the belonging value of a broadcasting sub-cluster, wherein a sub-cluster with at least one core node will broadcast a message to all neighbor sub-clusters, and wherein a sub-cluster no core node is an edge node that broadcasts a message indicating a need to be merged; and
removing sub-clusters without core nodes from the graph.

7. The method of claim 6 further comprising applying a message mining process changing a belonging value of at least one sub-cluster based upon a change of belonging value of at least one other sub-cluster.

8. The method of claim 7 wherein the message mining process comprises:
defining a bipartite graph, wherein a first portion of the bipartite graph includes sub-cluster ID's and corresponding belonging values, and a second portion of the bipartite graph includes destination ID values in messages of the sub-cluster.

9. The method of claim 6 wherein the network executes a Map-Reduce program, and wherein the message sending process is implemented as Map function of an edge cut and first merge job of the Map-Reduce program, and the merging process is implemented as a Reduce process of the edge cut and first merge job.

10. The method of claim 7 wherein the network executes a Map-Reduce program, and wherein the message sending process is implemented as Map function of merge job of the Map-Reduce program, and the message mining process is implemented as a Reduce process of the merge job.

11. The method of claim 1 wherein the network executes a Map-Reduce program, and wherein the density-based filter is implemented as a Map function of a partial density-based clustering job of the Map-Reduce program, and the partial connectivity detector process is implemented as a Reduce process of the partial density-based clustering job.

12. A system for identifying clusters in a large graph using a network of coupled machines, each machine executing a Map-Reduce process, the system comprising:
a processor; and
one or more stored sequences of instructions which, when executed by the processor, cause the processor to carry out the steps of:
a splitting function component partitioning the graph into a plurality of partitions by applying a splitting function to the graph and assigning each partition to a respective machine of the plurality of machines;
applying a density-based filter applied to each partition to produce a plurality of partitions of a filtered graph, the density-based filter applies one or more density constraints to each partition such that vertices with at least a minimum number of neighboring nodes within a distance defined by the density constraints include nodes with edges pointing to neighboring nodes and vertices that do not have the minimum number of neighboring nodes within the distance defined by the density constraints do not include nodes with edges pointing to neighboring nodes;
applying a partial connectivity detector applied to each of the partitions of the filtered graph to produce sub-clusters of nodes of the filtered graph based on the edges between the nodes; and
a merger merging the sub-clusters of nodes through a message based merge process.

13. The system of claim 12 wherein the partial connectivity detector is configured to:
identify all nodes in each partition that are connected to one another by at least one edge as a sub-cluster;
determine if each sub-cluster contains a core node; and
determine a belonging value for each sub-cluster, wherein the belonging value identifies which cluster a respective sub-cluster will be merged into.

14. The system of claim 12 further comprising an edge cutting component identifying multiple edges between pairs of sub-clusters, and removing all edges exceeding a single edge between a pair of sub-clusters if multiple edges exist between the pair of sub-clusters.

15. The system of claim 14 wherein the merger is configured to:
establish neighbor relationships among the sub-clusters based on the belonging value for each sub-cluster; and
assign an active or halt state to each sub-cluster.

16. The system of claim 15 further comprising a message sending component configured to:
broadcast a message when a sub-cluster is in an active state, the message comprises the belonging value of a broadcasting sub-cluster, wherein a sub-cluster with at least one core node will broadcast a message to all neighbor sub-clusters, and wherein a sub-cluster no core node is an edge node that broadcasts a message indicating a need to be merged; and
remove sub-clusters without core nodes from the graph.

17. The system of claim 16 further comprising a message miner configured to change a belonging value of at least one sub-cluster based upon a change of belonging value of at least one other sub-cluster.

18. A non-volatile, non-transitory machine-readable medium containing one or more sequences of instructions for controlling access to an application program on a computer network, the instructions configured to cause a processor to:
partition a graph to be processed by a network of coupled computers into a plurality of partitions wherein the number of the plurality of partitions is a function of the number of the plurality of machines;
assign each partition to a respective computer of a plurality of computers comprising the network by applying a splitting function to the graph;

apply a density-based filter to each partition to produce a plurality of partitions of a filtered graph, the density-based filter applies one or more density constraints to each partition such that vertices with at least a minimum number of neighboring nodes within a distance defined by the density constraints include nodes with edges pointing to neighboring nodes and vertices that do not have the minimum number of neighboring nodes within the distance defined by the density constraints do not include nodes with edges pointing to neighboring nodes;

apply a partial connectivity detector process that detects connectivity between nodes to each of the partitions of the filtered graph to produce sub-clusters of nodes of the filtered graph based on the edges between the nodes; and merge the sub-clusters of nodes through a message based merge process.

* * * * *